(No Model.)　　　　　　　C. PALITSCH.　　　2 Sheets—Sheet 1.
COFFEE ROASTER.
No. 312,376.　　　　　　Patented Feb. 17, 1885.
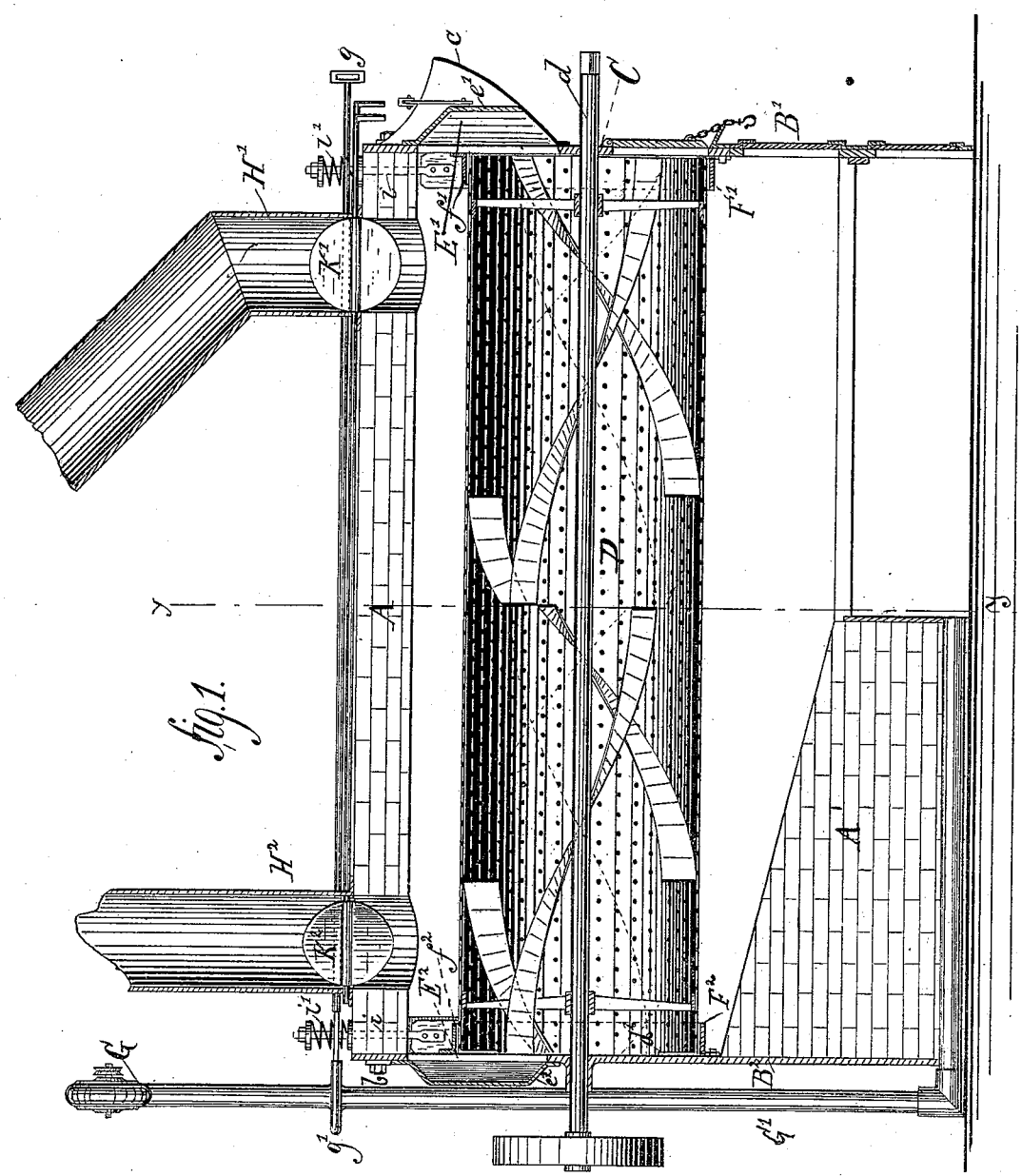
WITNESSES:　　　　　　　　　　　　　INVENTOR
Otto Riech　　　　　　　　　　Christian Palitsch
Martin Petry.　　　　　　　　　　BY
　　　　　　　　　　　　　　Joepel & Raegener
　　　　　　　　　　　　　　　　ATTORNEYS.

(No Model.)
C. PALITSCH.
COFFEE ROASTER.
No. 312,376. Patented Feb. 17, 1885.
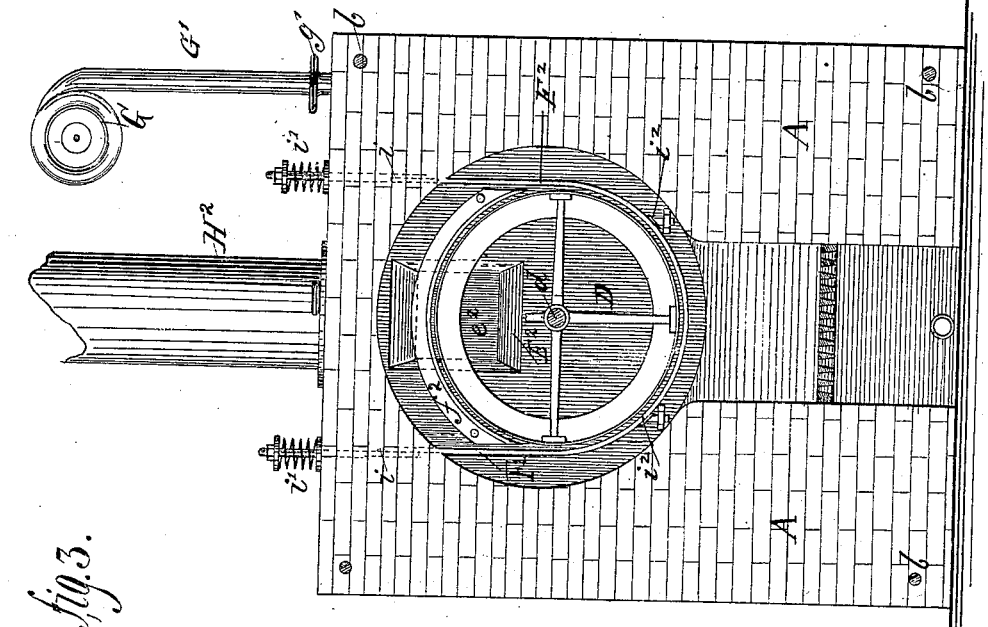
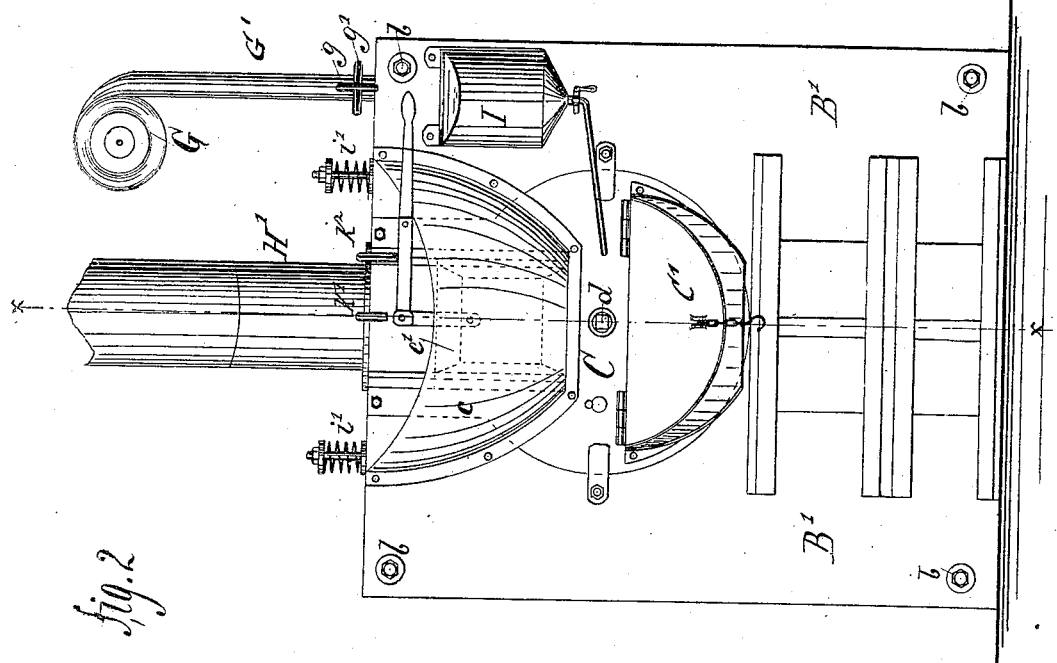
WITNESSES:
Otto Risch.
Martin Petry.
INVENTOR
Christian Palitsch
BY
Hopes & Raegener
ATTORNEYS

United States Patent Office.

CHRISTIAN PALITSCH, OF NEW YORK, N. Y.

COFFEE-ROASTER.

SPECIFICATION forming part of Letters Patent No. 312,376, dated February 17, 1885.

Application filed March 8, 1884. (No model.)

*To all whom it may concern:*

Be it known that I, CHRISTIAN PALITSCH, of the city, county, and State of New York, have invented certain new and useful Improvements in Machines for Roasting Coffee, of which the following is a specification.

My invention relates to improvements in machines for roasting coffee by which the vapors arising during the roasting process are prevented from entering the work-room, and in which combustible scales and shells are burned in the fire-chamber, and the roasting process regulated and fully within control; and the invention consists of certain details of channels and flues through which the vapors and scales from the roasting cylinder or drum are conducted off, and of fixed and movable flanges arranged on the end plates of the furnace for guiding the drum.

In the accompanying drawings, Figure 1 represents a vertical longitudinal section, on line $xx$, Fig. 2, of my improved machine for roasting coffee. Fig. 2 is a front elevation of the same, and Fig. 3 a vertical transverse section on line $yy$, Fig. 1.

Similar letters of reference indicate the same parts throughout the several views.

In the drawings, A represents a furnace provided in the usual manner with a cylindrical fire-chamber, grate, and ash-pit. The body of the furnace is made of brick, and closed at the ends by heavy cast-iron end plates, B' and $B^2$, which are connected by longitudinal keybolts $b$. The front plate, B', has an opening of sufficient size to permit the insertion and removal of the roasting-cylinder D, which opening is closed by a detachable face-plate, C, having a hinged part, C', for the discharge of the roasted coffee. Both iron plates are provided with upwardly-extending channels E' and $E^2$, which are kept closed by vertical slides $e'$ and $e^2$, said channels forming flues that connect the interior of the roasting-drum with the upper part of the fire-chamber, as shown by Figs. 1 and 3. The channel E' serves at the same time for supplying the roasting-cylinder with a new charge of coffee in connection with the hopper $c$. The roasting-drum D is made of perforated sheet-iron, and, as usual, provided with a shaft, $d$, connected to it by spider-frames. At the interior of the roasting-drum D are arranged spiral blades or stirrers, that serve to move the coffee forward and back in the cylinder and to turn the same. Both ends of the drum are open, the rear end having an inwardly-extending flange, $d'$, that moves closely to the rear plate, $B^2$, but without touching the same. The plates B' $B^2$ are provided above the roasting-cylinder D with fixed segmental flanges $f'f^2$, and sidewise of and below the same with movable flanges or bands F' $F^2$, which latter are extended in upward direction and attached to suspension-bolts $i\,i$, that pass through the arched brick wall at the top of the furnace, and are supported by washers on spiral cushioning springs $i'$. The flanges F' and $F^2$ fit thereby tightly around the drum D without interfering with the motion of the same, and prevent the beans from escaping between the rim of the drum and the end plates, B' $B^2$. The lower parts of the movable flanges F' $F^2$ rest upon inclined and adjustable cheeks or seats $i^2$, as shown in Fig. 3, whereby the flanges F' $F^2$ are held in proper position to the drum D and plates B' $B^2$. The spring-cushioned flanges F' $F^2$ "give" sufficiently to provide for the expansion and contraction of the drum, whereby strains caused by too great friction between the drum and flanges are avoided. This is an essential feature of my construction, as considerable power is gained, and the drum is rotated in a regular and uniform manner without being affected by the varying temperature in the fire-chamber. When the cylinder D is charged with coffee, the blower G is put into action by the handle $g$ of the damper-rod, the damper of which is located in the air-pipe G' at the rear of the furnace, whereby a lively combustion is produced on the grate and a high degree of heat obtained in the fire-chamber. The scales and shells are forced through the holes of the drum, and are conducted through the passages E' and $E^2$ into the fire-chamber, where they are burned up, while the vapors are carried off through the flues H' and $H^2$. Toward the end of the roasting process the remaining particles are driven off by admitting water to the interior of the drum by opening the water-tank I. The steam-vapors are drawn off through the passages E' and $E^2$ and flues H' and $H^2$ without annoying the attendants. When the fire is not wanted to burn lively—that is to say, when the roasting operation is to be interrupted for some time—the blower is stopped and the damper closed, and thereby the fire stopped till a new charge is ready to be placed into the drum.

My improved coffee-roaster is operated as follows: When the fire is burning briskly, the charge of coffee is run into the roasting-drum, which is then revolved by steam-power. The doors and slides are kept closed, the damper of smoke-pipe open, and the damper of air-pipe set as required by the condition of the fire. When the contents are nearly roasted, a sample is taken from the drum through the small opening in the plate C, Fig. 2. The water-tank is then opened and as much water admitted as is necessary to give the required color. The steam forces the remaining scales into the fire-chamber, where they are burned. The vapors pass off through the flues $H'$ $H^2$, the dampers of which are opened for this purpose, so as to give a quick outlet for the same without annoyance to the attendants.

Having thus described my invention, I claim as new and desire to secure by Letters Patent—

1. The combination of a furnace, A, having upwardly-extending flues $H'$ $H^2$, face-plates $B'$ $B^2$, a perforated rotating drum, D, blower G, and channels $E'$ and $E^2$ in said face-plates, connecting the interior of said drum with the upper part of the fire-chamber, substantially as described.

2. The combination of a furnace, A, having upwardly-extending flues $H'$ $H^2$, face-plates $B'$ $B^2$, a perforated rotating drum, D, blower G, channels $E'$ $E^2$ in said face-plates, connecting the interior of said drum with the upper part of the fire chamber, and the hopper $c^2$ and slide $e'$ in one of said channels, substantially as described.

3. The combination of a rotating cylinder or drum, face-plates having fixed segmental flanges above the drum and movable flanges extending around the lower parts of the drum, said flanges being suspended by rods from the top of the furnace, and means for guiding the movable flanges at their lower parts, substantially as set forth.

4. The combination of a roasting cylinder or drum, face-plates having fixed segmental flanges above the drum, and movable guide-flanges extending around the lower parts of the drum, suspended by rods on cushioning-springs, and guided at their lower parts in cheeks of the face-plates, substantially as set forth.

5. In a roasting-chamber, the combination of the face-plates $B'$ $B^2$ and the perforated open-ended drum D, provided with inwardly-extending flange $d'$ at one end, substantially as set forth.

In testimony that I claim the foregoing as my invention I have signed my name in presence of two subscribing witnesses.

CHRISTIAN PALITSCH.

Witnesses:
PAUL GOEPEL,
SIDNEY MANN.